Aug. 27, 1940.
C. W. MURRAY
2,212,670
GUY WIRE CLAMP
Filed Oct. 21, 1939
2 Sheets-Sheet 1
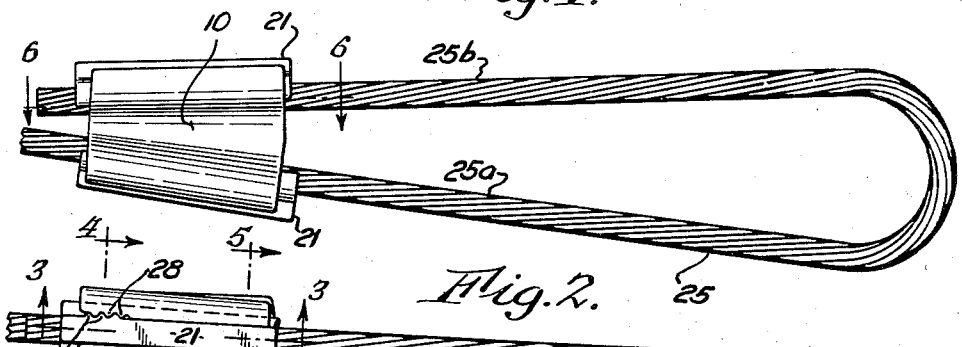
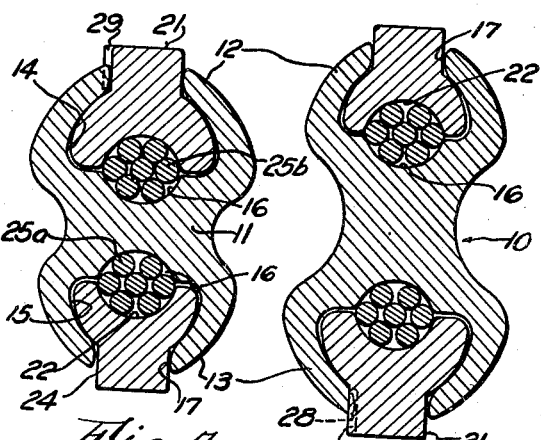
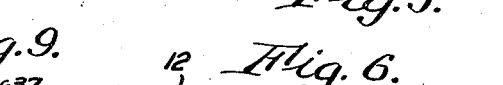
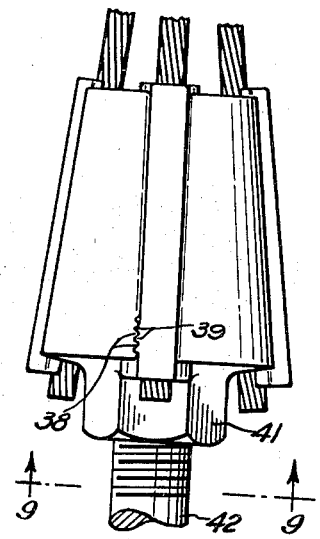
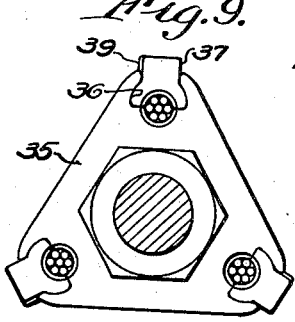
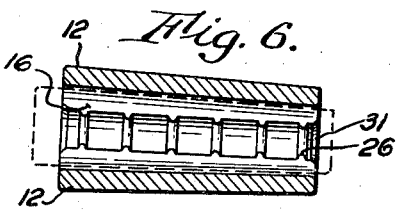
INVENTOR
Christopher W. Murray
BY Albert R Henry
ATTORNEY Aug. 27, 1940.  C. W. MURRAY  2,212,670
GUY WIRE CLAMP
Filed Oct. 21, 1939  2 Sheets-Sheet 2
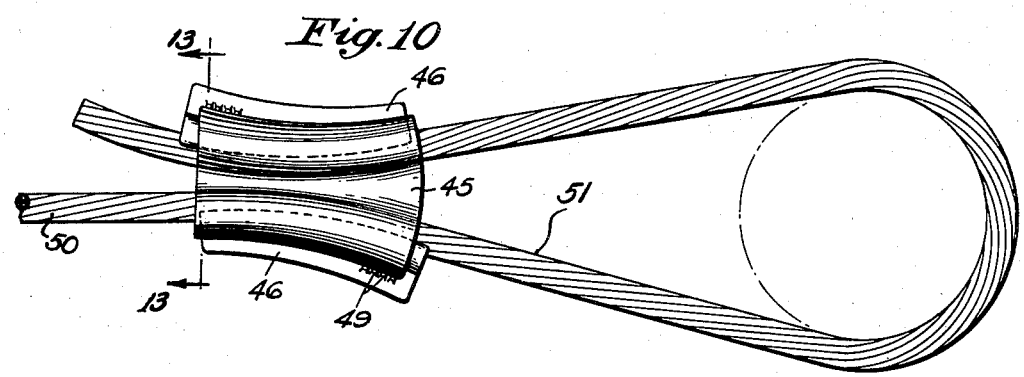
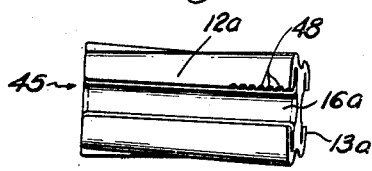
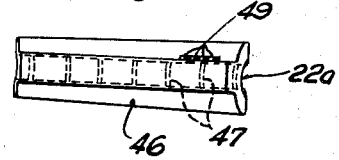
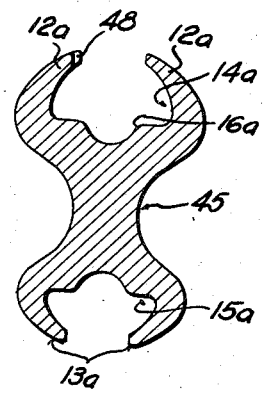
INVENTOR
Christopher W. Murray
BY Albert R Henry
ATTORNEY Patented Aug. 27, 1940

2,212,670

UNITED STATES PATENT OFFICE 2,212,670

GUY WIRE CLAMP

Christopher W. Murray, Kenmore, N. Y.

Application October 21, 1939, Serial No. 300,667

4 Claims. (Cl. 24—126)

This invention relates to clamps for holding together two or more wires or cables, such as guy wires used to support telephone poles, masts, fence posts, and the like; and it has for its principal object the devising of an improved clamp which is inexpensive to manufacture, easy to apply, and durable in service.

This case is a continuation in part of my prior application Serial No. 267,270, filed April 11, 1939, the claims of which have been transferred to this case.

The invention will be readily understood from the following description of typical embodiments of the principles thereof, read in connection with the accompanying drawings, while the novel features will be set forth in the subjoined claims.

In the drawings:

Fig. 1 is a side view of one form of clamp as placed in service to hold a tensioned guy wire and the free or dead end thereof;

Fig. 2 is a plan view of the assembly shown in Fig. 1;

Figs. 3, 4, 5, and 6 are sections taken on the correspondingly indicated lines in Figs. 1 and 2;

Fig. 7 is a bottom view of a wedge element;

Fig. 8 is an elevation of a modified form of clamp, particularly adapted to hold three wires and to be affixed to a post, these parts being fragmentarily shown;

Fig. 9 is a view taken on the line 9—9 of Fig. 8;

Fig. 10 is a top view of a further modification of the invention, which is shown in an operative position on a tensioned wire;

Fig. 11 is a side view of the clamp body of Fig. 10;

Fig. 12 is a top view of one of the wedges of Fig. 10; and,

Fig. 13 is a section through the clamp body, taken on the line 13—13 of Fig. 10.

The clamp shown in Figs. 1 to 7 inclusive comprises a body 10 formed with a medial section 11 from which extend spaced opposed pairs of tines 12 and 13, thus providing two cable receiving apertures 14 and 15. The apertures, as best shown in Figs. 4 and 5, are formed with recessed bottoms 16 to receive the cable, and the tines 12 or 13 curve inward and terminate in comparatively plane walls 17, which are parallel to each other. As best shown in Figs. 4, 5 and 6, the elongated apertures 14 and 15 are tapered in opposite directions.

A wedge 21 is inserted in each aperture, and is in the form of an elongated block whose underside is formed with a semi-circular recess 22 which is scored with helical ribs 23, as best shown in Fig. 7. The side walls of the wedge 21 are curved to conform to the curvature of the inner surfaces of the tines 12 and 13, while the top of the block is formed with parallel side walls 24 to engage against the plane surfaces 17. The wedges 21 are tapered for their entire length to match the taper of the apertures 14 and 15. Thus, one wedge 21 will be inserted in the aperture 14 from one end of the block 10, while the other wedge 21 will be inserted in the aperture 15 from the opposite end. The purpose of this is to render the wedges 21 self tightening when tension is applied to the guy wire 25, which is to be held in the clamp.

Referring now to Figs. 1 and 2, it is to be understood that a guy wire 25, having one end contiguous with the section 25a secured to a post or the like, is brought through the aperture 15, and is turned with a bight around a snubbing post (not shown) and then the dead end 25b is extended through the aperture 14. The wedges are then driven home, in a manner hereinafter more fully described, and in this condition of service, the tension in the wire 25 will be from right to left, in the section 25a, and from left to right, in the section 25b. These forces, however, work against the taper of the wedges 21, causing the wedges to be tighter and tighter, as more force is applied to the wire. The wedges are therefore self tightening.

Reference may also be made here to Fig. 6, from which it will be seen that the recesses 16 in the body 10 are also scored with ribs 26 which cooperate with the ribs 23 to grip the wire tightly.

In a clamp of this nature, and due to conditions of service, there is invariably some tendency for the wedges to loosen during use. In the present invention, and as best shown in Figs. 2, 4, and 5, the walls 12 and 13, adjacent the big end of each aperture, are formed with teeth 28, while the side faces 24 of the wedges are formed with complementary teeth 29. The teeth 29 project from the plane walls 24 sufficiently that the wedges 21 cannot be forced all the way home without springing the side wall 12 or 13 which they abut. Therefore, in use, the wedges are pushed into the apertures as far as they will go, to grip the wire, and then they are driven home by sharp blows, which cause the side walls 12 and 13 to spring apart enough to permit the teeth 29 to mesh with the complementary teeth 28. In this relation, the wedges are securely connected into their respective apertures, and are firmly held in place without resort to bolts or separate tie wires or other unsatisfactory expediencies.

It is furthermore to be noted that the body 10 is given a taper, and therefore the apertures 14 and 15 are convergent, rather than parallel. The function of this will also be understood from Fig. 1, from which it will be seen that the dead end of the wire 25 has to be brought back alongside of the tension end 25a, to get both ends into the clamp. A sharp bend cannot be made in the wire 25, both because such a bend would weaken the wire, and the snubbing post has to have some size itself. Heretofore, it has been common to use a very long length of wire on the dead end, and to space the clamp, of whatever type used, a considerable distance from the snubbing post, thus overcoming abrupt bends, but also wasting the wire. According to the present invention, the clamp body is tapered as shown, so that the tension end and dead end can be brought together smoothly and in a short space, thereby saving several feet of valuable wire on the dead end, which heretofore has been lost.

It will also be noted, particularly from Fig. 3, that the ends of the recesses 16 and 22 are flared outwardly, as indicated by the numeral 31, thus preventing chafing of the wire at the points where it contacts the clamp.

The clamp shown in Figs. 8 and 9, while embodying the same principles and features as the clamp of the preceding views, is of somewhat different form, and is intended for use in holding the several strands of a cable, without employing snubbing posts, bights, and secured dead ends. The body 35 is of generally pyramidal form, and is formed at its apices with elongated apertures 36, each adapted to receive a wedge 37. The only difference in this construction of aperture and complementary wedge is, that the apertures are all tapered in the same direction, since the strain on the several strands is all in the same direction. The body 35 is, as shown, tapered toward the point of maximum adjacency of the wires to be secured—in this case toward the main cable from which the strands are taken. This carries into the modification the same feature utilized in the type shown in Fig. 1.

Similarly, the wedges are self-tightening, and they are firmly locked in place, by providing cooperating and intermeshing teeth 38 and 39.

The large end of the body 35, however, is formed with a boss 41, which is drilled and tapped for connection to a threaded post 42 which serves as an anchor. Thus, with this form, the guy wire may be run up to an anchor 42 set in concrete, and the strands at the cable end lead into the apertures of the clamp 35, previously affixed to the post 42.

When more severe stresses are encountered, it is preferred to use the type of clamp shown in Figs. 10 to 13, wherein the clamp body 45 and wedges 46 are similar to those of Fig. 1, with the exception that the cable receiving apertures 14a, 15a, are curved so that each recessed bottom 16a and associated tines 12a or 13a conform to radii which give them the desired tapering characteristic. The wedges 46 are formed with complementary curved surfaces so that they may enter the apertures in a circular path.

It may also be preferred to make the bottoms 16a of the recesses smooth and devoid of ribs, which are supplied only in the recesses 22a of the wedges, as indicated by the numeral 47 in Fig. 12. Complementary teeth 48 and 49 are formed in the body 45 and wedges 46 respectively.

It will be observed that the curved sockets thus provided for the cable insure that the stress from the tensioned leg 50 of the cable be transmitted to the loop portion 51 thereof without abrupt bends in the cable, to the end that bending strains are uniformly distributed. It will also be noted that during installation and use, the cable obtains an excellent grip on the curved serrated surfaces of the wedges, and if the tension is increased, it only locks the cable more firmly.

While the invention has been described with respect to certain specific embodiments thereof, it will, of course, be understood that it is not limited thereto, but may be applied in such other forms as fall within its scope, as set forth in the following claims.

I claim:

1. A clamp for guy wires comprising a body portion formed with a plurality of spaced longitudinal apertures open on the surface of the body, each of said apertures delimited by a portion of the body and spaced converging tines extending outwardly therefrom, said tines including curved portions adjacent said body and substantially plane portions at the ends thereof, wedge members adapted to be inserted in said apertures from the ends thereof to grip a wire disposed in the aperture, said wedges having sections corresponding to the section of the aperture formed by said tines, and a plurality of complementary teeth disposed on said plane portions and adapted to interlock with each other only when said wedge is driven into said aperture with force.

2. A clamp for guy wires comprising a body portion, a plurality of pairs of tines extending outwardly from spaced zones on said body portion, each pair of tines having sections which curve inward toward each other and substantially plane surfaces at their ends, thereby defining wire-receiving apertures disposed longitudinally of the body, each of said apertures tapering from one end of the body to the other, said apertures tapering with respect to each other, wedge members adapted to be inserted in each of said apertures from one end thereof, said wedge members tapering and in section conforming to the walls of the apertures, complementary teeth on the upper sides of the wedge members and the plane walls of said tines, whereby, upon driving said wedge members into said apertures, the teeth intermesh to lock the wedge members to the body, the body adjacent said apertures and the under side of said wedge members having scored recesses to encircle a wire disposed in said aperture, the extremities of said wedge members and the body at the extremity of said apertures having outwardly flared portions to prevent chafing of the wire.

3. A clamp for guy wires comprising a body portion, a plurality of pairs of tines extending outwardly from spaced zones on said body portion, each pair of tines including sections curved inwardly toward each other and having substantially plane faces at their ends, thereby defining wire-receiving apertures disposed lengthwise of the body, said apertures tapering from one end of the body to the other, said apertures tapering with respect to each other thereby imparting a greater spacing between the apertures at one end of the body than at the other end of the body, wedge members adapted to be inserted in each of said apertures from one end thereof, said wedge members also tapering and in section conforming to the walls of the apertures, complementary teeth on the upper sides of said wedge members and the plane walls of said tines, whereby, upon driving said wedge members into said apertures, the teeth intermesh to lock the wedge members to the body, the under surface of said wedge members and the body portion covered thereby in assembled relation having at least in part wire engaging deformations.

4. A clamp for guy wires comprising a body portion, a plurality of pairs of tines extending outwardly from spaced zones on said body portion, each pair of tines including sections curved inwardly toward each other and having substantially plane and spaced faces at their ends, thereby defining an open aperture extending along the body, said aperture, at one end thereof, having a larger section than at the other end and tapering from one end to the other, a wedge member adapted to be disposed in each said aperture, said wedge member having a curvilinear portion adapted to be disposed between the curved sections of the tines and a plane section adapted to be disposed between the spaced plane ends thereof, said wedge member having a progressively reduced section to conform to the taper of said aperture, said tines and wedge member having an arcuate formation from one end of the body member to the other thereby to position a wire gripped thereby along an arc, said wedge member on the plane section thereof and said tines on the spaced plane faces thereof having complementary teeth adapted to interlock when said wedge member is forcibly driven into said aperture.

CHRISTOPHER W. MURRAY.